Nov. 15, 1927.
C. S. BUSHNELL
1,649,444
BRAKE APPLYING APPARATUS
Filed Sept. 5, 1925
2 Sheets-Sheet 2
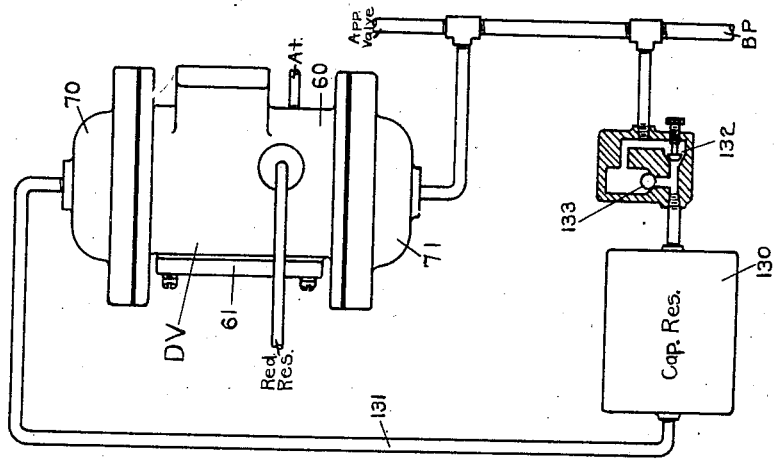
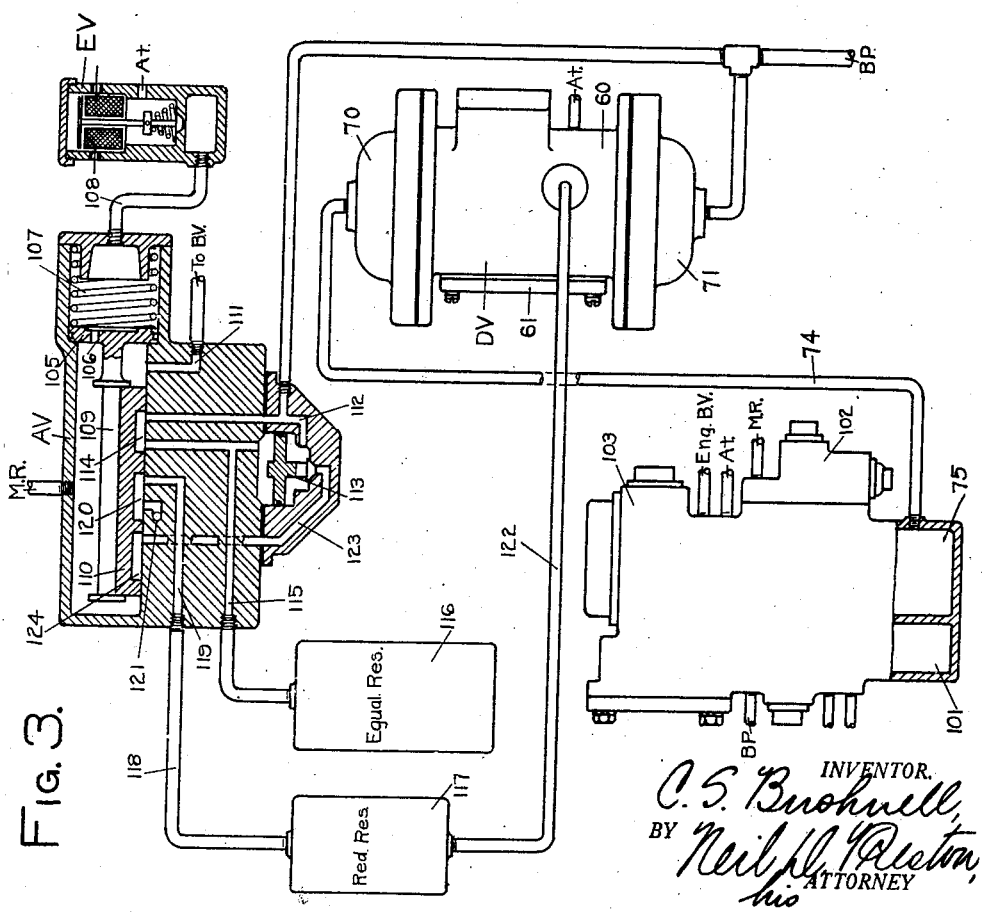

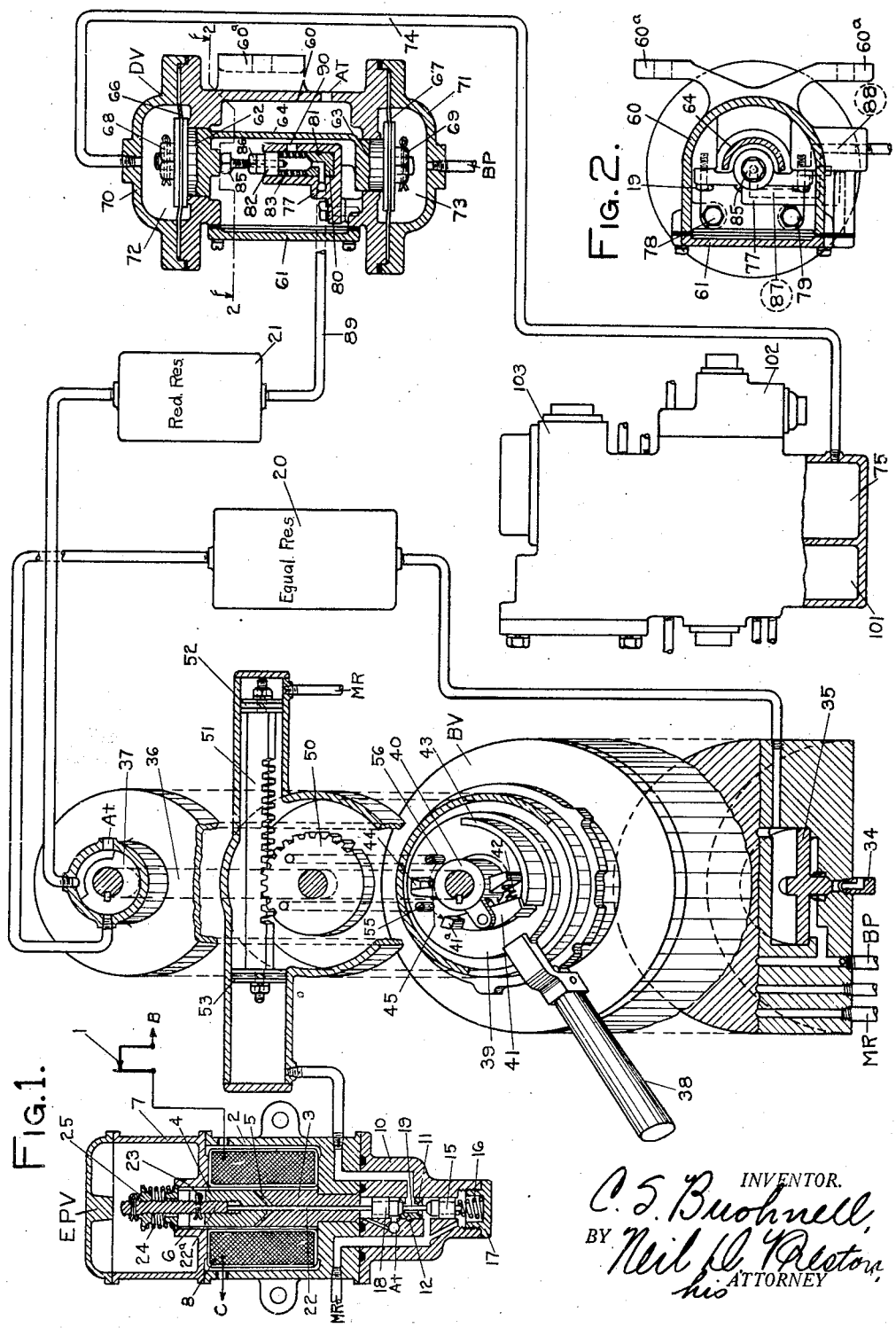

Patented Nov. 15, 1927.

1,649,444

UNITED STATES PATENT OFFICE.

CHARLES S. BUSHNELL, OF ROCHESTER, NEW YORK, ASSIGNOR TO GENERAL RAILWAY SIGNAL COMPANY, OF ROCHESTER, NEW YORK.

BRAKE-APPLYING APPARATUS.

Application filed September 5, 1925. Serial No. 54,745.

This invention relates to apparatus for automatically applying the brakes for train control purposes on trains equipped with an air brake system of the usual type, commonly known as the Westinghouse automatic air brake system, and more particularly to improvements in such automatic brake control apparatus which will provide a predetermined reduction in brake pipe pressure to give a definite brake application under normally running conditions, and which will also give such definite brake application, or as much as is available, even though the automatic application should occur immediately after a release of the brakes and before the system is re-charged.

For various reasons, familiar to those skilled in air brake art, it has been proposed to construct the air brake control apparatus used in train control systems so that this apparatus will produce a predetermined or limited reduction in brake pipe pressure, ordinarily a reduction corresponding to a full service application. The various reduction limiting devices proposed have all been constructed, so far as I know, on the principle of making a limited reduction in the brake pipe pressure, or the pressure in a reservoir connected thereto, existing at the time the automatic brake control apparatus is set into operation. Under normal running conditions, the existent brake pipe pressure is the same as that in the auxiliary reservoirs on the train, and represents the available breaking pressure. After the brakes have been applied, however, then released, and the operation of re-charging the brake pipe and auxiliary reservoirs is taking place, the pressure then existing in the brake pipe, and in any reservoir directly connected thereto, is for a time higher than the pressure in the auxiliary reservoirs and available for braking, on account of the fact that the auxiliary reservoirs are fed from the brake pipe through the restricted feed grooves. While this excess pressure in the brake pipe, above that in the auxiliary reservoirs, may exist only for a relatively short time, while the re-charging operation is occurring, it is possible in a train control system for the automatic brake applying operation to occur during this time; and from the standpoint of safety, it is considered important that the brakes be applied as effectively as possible, without any interference by the reduction limiting device.

In accordance with the present invention, it is proposed to provide a reduction limiting device, in connection with a suitable automatic brake applying means, which has its operation based upon the pressure existing in the auxiliary reservoirs, or the equivalent, and actually available for braking, rather than upon the brake pipe pressure existing at the instant the automatic braking operation occurs. More specifically, it is proposed to provide a device comparing the existing brake pipe pressure and the pressure in the auxiliary reservoirs, or equivalent, and combine this device with an automatic brake applying apparatus, having a predetermined or limiting reduction feature, in such a way that the operation of the limiting reduction means will not begin in effect until the brake pipe pressure is the same or lower than the pressure in the auxiliary reservoirs.

While the characteristic features of the invention, broadly considered, may be obtained in various ways and with various types of devices, one specific object of the invention is to improve the type of automatic brake applying apparatus and reduction limiting means which comprises an equalizing reservoir, or equivalent, charged at the existing brake pipe pressure, and a reduction reservoir, so that the reduction reservoir is connected to atmosphere until the brake pipe pressure is the same or less than that in the auxiliary reservoirs of the train.

Other objects, purposes and characteristic features of the invention will be in part obvious and in part pointed out, as the description progresses.

In the accompanying drawings, Fig. 1 illustrates in a simplified and diagrammatic manner, one specific embodiment of the invention applied to a system in which the brakes are automatically applied by actuating the engineer's brake valve to the service position and the limited reduction obtained by connecting the equalizing reservoir to a reduction reservoir;

Fig. 2 shows a horizontal section of the release valve, forming a part of the system shown in Fig. 1, said section being taken on the line 2—2, looking in the direction indicated by the arrows, shown in Fig. 1;

Fig. 3 illustrates a modified form of the invention applied to an application valve for automatically applying the brakes; and Fig. 4 shows a further modification in which a reservoir, with a restricted feed from the brake pipe, is used to give a pressure representative of that in the auxiliary reservoirs of the train, rather than the pressure chamber of the distributing valve of the well known E. T. equipment, used for that purpose in the modifications of Figs. 1 and 3.

Before taking up in detail the description of the construction and operation of the specific devices illustrated, it should be understood that the particular means shown is merely typical and illustrative, and is susceptible of material modification or adaptation by the use of various devices well known in the art and the application of expedients that will be obvious to those skilled in the art.

The means for automatically applying the brakes and constituting the present invention is not limited to any particular type of train control system, and may be employed to produce an automatic brake application, whenever desired, to carry out a train control function, whether an automatic stop, a permissive stop, or a speed control system. Ordinarily, in the usual type of train control system, the brakes are applied by opening a normally closed valve. For the purpose of explaining the invention it is assumed that an electro-pneumatic valve will be used for this purpose, and that its normally closed energizing circuit will include a contact, diagrammatically shown and designated 1, which is opened at the time an automatic brake application is desired by the operation of the train control equipment.

The particular electro-pneumatic valve E. P. V. shown is one specially designed to facilitate adjustment and maintenance. This valve E. P. V. is of the solenoid type, and comprises a body portion 2 of magnetic material, a stationary core 3, riveted or otherwise secured to said body portion, and a movable core 4. The upper end of the stationary core 3 is shaped to receive the conical end of the movable core 4, a residual ring 5 of suitable non-magnetic material being provided to prevent direct contact between the cores. The movable core 3 is guided by a sleeve 6 of non-magnetic material, preferably brass, which is held in place by a detachable cap 7. A coil 8 of usual construction surrounds the sleeve 6. Secured to the bottom of the body member 2 by an air-tight joint is a detachable valve housing 10, having an axial cylindrical opening therein aligned with the cores 3 and 4. Tightly fitted in this opening of the valve housing 10 is a double valve seat 11, locked in place by a transverse pin or screw 12. Adapted to seat on the lower valve seat is a valve 15, which is guided in the cylindrical opening in the valve housing 10, and which is urged upward by a compression spring 16 held in place by a threaded cap 17. Adapted to seat on the upper valve seat is another valve 18, which has a stem 19 integral therewith to engage the lower valve 15. Extending loosely through the fixed core 3 is an operating pin or rod 22, engaging the upper valve 18 at its upper end. Suitably secured to the upper end of this operating rod 22, or integral therewith, is a member $22^a$ threaded into the movable core 4, said member $22^a$ being conveniently fastened in its adjusted position by a cotter pin 23 in a transverse slot in the upper end of said movable core. The member $22^a$ is urged upward by a spring 24, interposed between a boss on the movable cap 7 and a flanged nut 25 on said member, said nut being conveniently fastened in its adjusted position by a transverse cotter pin.

This construction facilitates adjusting the electro-pneumatic valve E. P. V. to have the desired operating characteristics. The downward movement of the operating rod 22 being limited by the seating of the upper valve 18, the working air gap between the cores 3 and 4 may be adjusted by turning the member $22^a$ in the movable core 3. The upward biasing on the movable core 3, provided by the springs 16 and 24 may be adjusted. The area of the upper valve 18, exposed to pressure with this valve seated, is preferably made slightly smaller than the area of the lower valve 15, exposed to atmospheric pressure when seated, so as to obtain the desired difference in the pick-up and drop-away currents. In order that the valves 15 and 18 may not be sluggish, due to trapped pressure, their guiding portions are preferably formed with longitudinal grooves, as indicated by dotted lines, and passages are also preferably provided to establish a connection between the opposite ends of these valves. The space between the upper and lower valve seats of the double valve seat 11 is connected by a passage and pipe to the brake valve actuator, hereinafter described; the space above the upper valve seat is connected to a port At. leading to atmosphere; and the space below the lower valve seat is connected by a passage and pipe to a source of pressure, such as a main reservoir. It will be evident that, when this valve E. P. V. is energized, pressure is supplied to the brake valve actuator, and when de-energized, this pressure is cut off, and the brake valve actuator vented to atmosphere.

*Brake valve actuator.*—In the embodiment of the invention shown in Fig. 1, the brakes are automatically applied by shifting the usual engineer's brake valve, regularly used by the engineer in making manual brake applications, to the service position, the operating handle being disconnected at the same time, so that the engineer cannot prevent the automatic application. The specific construction of the brake valve actuator is not material to the present invention, and since the construction of a brake valve actuator suitable for this purpose is disclosed in detail in my prior application, Ser. No. 16,973, filed March 20, 1925, I have shown herein in a simplified and diagrammatic manner, merely the important parts of this device, and will describe its construction and operation only so far as required to make its functions and characteristics understood.

The engineer's brake valve, including the usual equalizing discharge piston valve 35, is shown diagrammatically, partly in section and partly in outline, and designated as a whole BV. The rotary valve (not shown) is fixed to the operating stem or shaft 36, which extends upwardly above the casing of the engineer's valve proper into a casing of the brake actuator mechanism, the parts and casing being shown cut away and separated to simplify the illustration. The passage and preliminary service exhaust port, connected to the upper side of the equalizing discharge piston valve 35, used in the ordinary construction of engineer's brake valves is omitted or plugged up, so that the equalizing reservoir is not exhausted to atmosphere in the usual way, when the engineer's valve is in the service position. To the upper end of the operating stem 36 is fixed a special service exhaust valve 37, shown in a simplified form, which connects the equalizing reservoir to a reduction reservoir, when the rotary valve and its stem 36 are in the service position, and which also connects the reduction reservoir to atmosphere, when the rotary valve is in the running position or also the lap position, as fully explained in my prior application above mentioned. By reason of this construction, when the engineer's valve is moved to the service position, either automatically or manually, equalizing reservoir pressure, instead of being exhausted directly to atmosphere, is exhausted into a reduction reservoir. It will be evident that, by properly proportioning the volumes of the equalizing reservoir and the reduction reservoir, the lowest pressure to which the equalizing reservoir may drop, that of equalization, can be made any desired ratio or proportion of the initial pressure. In this way, the maximum reduction in equalizing reservoir pressure, and likewise in brake pipe pressure, may be limited to some selected predetermined value when an automatic brake application occurs.

Referring now to the means for shifting the valve stem 36 to the service position, and disconnecting the handle, the handle 38 is integral with a plate 39 loosely mounted on the stem 36. Keyed, or otherwise rigidly connected, to the stem 36, is an operating member 40, conveniently called a spider, which carries a pivoted latch 41, one end of which is pressed outward by a spring 42, interposed between said latch and a projecting lug on the spider 40, in position to engage the end of a curved stop 43 integral with the handle plate 39. An upwardly projecting lug 44, integral with the handle plate 39, engages a projecting arm 45 on the spider 40, so as to connect the handle plate to the stem 36 for counter-clockwise movement, that is, in a direction toward the service or emergency positions. In other words, the handle is always operatively connected to the valve stem 36 to apply the brakes. With the latch 41 in its normal engaging position as shown, the handle is also connected to the valve stem 36 for movement in a clockwise direction, that is, in a direction toward the running or release positions.

Loosely mounted on the stem 36 above the spider 40 is a pinion 50, which is connected by a rack to a small piston 52 and a large piston 53 in corresponding operating cylinders. Fixed to the pinion 50 is a downwardly projecting pin 55 arranged so that, when said pinion is rotated counter-clockwise, this pin engages a projection 41$^a$ on the latch 40 and rocks this latch in opposition to the spring and disengages it from the lug 43 on the latch plate 39. Another downwardly projecting pin 56, secured to the pinion 50, is arranged to engage the projecting lug 45 on spider 40, when the pinion is turned.

The small piston 52 is exposed at all times to main reservoir pressure. This same main reservoir pressure is normally supplied to the large piston 53, so long as the valve E. P. V. is energized. Consequently, the parts are normally in the position shown. When the valve E. P. V. is deenergized, and the pressure is exhausted from the face of the large piston 53, the pressure on the small piston 52 moves the rack 51 to the left and turns the pinion 50, first disengaging the latch 41, and then through engagement of the pin 56, with the projecting arm 44, shifts the spider 40 and the valve stem 36 to the service position. In this position, the equalizing reservoir is connected to the reduction reservoir by the valve 37, as previously explained and the brakes are automatically applied in the usual way through the equalizing valve 34 as the pressure in the equalizing reservoir drops. In this connection, it should be understood that the ports or passages are so proportioned that the pressure in the equalizing reservoir drops slowly at the desired rate, in accordance with regular air brake practice.

When the electro-pneumatic valve E. P. V.

is again energized, pressure is supplied to the large piston 53, and the rack 51 and pinion 50 are restored to the normal position. The valve stem 36 and the spider 40, however, remain in the service position due to the friction, there being no positive driving connection, in this particular construction, between the pinion 50 and the spider 40, for movement of the stem 36 toward the release position. The engineer may move his handle 38 to the service position and allow the spring 42 to force the latch 41 into locking engagement, whereupon the engineer may restore the stem 36 and the rotary valve to the release or running position and release the automatic brake application. When the stem 36 is returned to the lap position, the equalizing reservoir is cut off from the reduction reservoir, and in the same position, or in the running position, as desired, the reduction reservoir is exhausted to atmosphere. Various specific features and advantages of the brake valve actuator described are pointed out in full in my prior application above mentioned; but, for an understanding of the present invention, it is sufficient to note how the automatic application, with a limited reduction, is produced as already explained.

*Release Valve.*—One of the important elements of the combination constituting the present invention is a device, preferably pneumatically operated, and conveniently termed a release valve, which serves, generally speaking, to connect the reduction reservoir to atmosphere whenever and so long as the brake pipe pressure is higher than that existing in the auxiliary reservoirs on the train and available for braking. In the modification shown in Fig. 1, the pressure equivalent to that existing in the auxiliary reservoirs on the train is taken to be that in the pressure chamber of the distributing valve forming part of the well known E.T. equipment for locomotives, this pressure chamber being in effect the auxiliary reservoir for the locomotive and tender equipment, as will be readily understood by those skilled in the air brake art. Consequently, the release valve in question serves to connect the reduction reservoir to atmosphere when the brake pipe pressure exceeds that in the pressure chamber of distributing valve.

The release valve, designated as a whole DV, is shown in longitudinal section in Fig. 1 and in transverse section in Fig. 2. This valve DV comprises a body portion 60, provided with supporting brackets 60ª, which in general is a box-like form, with a detachable cover 61, and which has circular openings in its upper and lower ends, surrounded by flanges. Plungers 62 and 63 connected by a curved web 64, are guided in the openings in the end of said body portion 60; and to these plungers 62 and 63 are secured, by clamp washers and nuts 68 and 69, flexible diaphragms 66 and 67. The edges of these diaphragms are clamped between the flanges on the body portion 60 and covers 70 and 71, these covers together with the diaphragms forming upper and lower closed chambers or compartments 72 and 73. The upper chamber 72 is connected by a pipe 74 to the pressure chamber 75 of the distributing valve, this valve being shown in the outline, with no attempt to illustrate its operating parts. The lower chamber 73 is connected to the equalizing reservoir, or to the brake pipe, preferably the latter.

Fastened to the main casing 60 by tap bolts 78 and 79, is a valve housing 77. In this valve housing 77 is a valve seat 80, preferably locked in position by a transverse screw or pin 81, and a valve 82, urged upwardly from its seat by a spring 83. Into the top of the valve 82 is threaded a plunger 85, locked in its adjusted position by lock nuts 86. The head of this plunger is engaged by the upper plunger 62. The valve seat 80 is connected by a passage 87 in the valve housing 77, a passage 88 in the main casing 60 (Fig. 2), and a pipe 89 to the reduction reservoir. The space above the valve seat is connected by a port 90 to the inside of the main casing 60 and thence to atmosphere by leakage or through a suitable port At.

Under normal running conditions, the pressures in the pressure chamber of the distributing valve and in the brake pipe are equal; and consequently the pressures on the diaphragms 66 and 67 are equal. In addition to the upward and downward pressures, depending on the exposed areas of the diaphragms 66 and 67, there is the weight of the plungers 62 and 63, and their connecting web 64, and also the pressure of the spring 83, to be considered. The spring 83 is preferably light, exerting merely sufficient force to open the valve. Taking these factors into consideration, the exposed areas of the diaphragms 66 and 67 is preferably proportioned so that, with equal pressures in the chamber 72 and 73, the valve 82 is closed. The plungers 62 and 63 are of different diameters merely to facilitate assembly.

*Operation*—From the previous explanation, it will be readily understood how the brakes are automatically applied and released under normal conditions. When a manual brake application is made, there is the same limited reduction in equalizing reservoir, corresponding to the relative volumes of the equalizing reservoir and reduction reservoir, so long as the engineer leaves his brake valve in the service position. The engineer can readily obtain a greater reduction, however, by restoring his valve to the lap position to exhaust the reduction reservoir, and then returning his valve to the service position.

Coming now to the special, and rather unusual, conditions which the present invention is designed to satisfy, imagine that the engineer makes a manual brake application, for example, a full service, then releases this application, and that at this time, with the brakes released and before the auxiliary reservoirs on the cars of the train have been fully re-charged, the brake valve actuator is automatically operated. Under these conditions, the pressure in the brake pipe and in the equalizing reservoir is abnormally high, being directly connected to the main reservoir, which is probably at a higher pressure than normal, due to the operation of the excess pressure governor head. Not only is the pressure in the equalizing reservoir likely to be above the normal running pressure, but also the pressure in the equalizing reservoirs of the cars is much lower than the normal pressure. The time taken to re-charge the auxiliary reservoirs on the car to their normal condition varies with a number of factors; but there is frequently a time interval of as long as ten seconds, during which the automatic brake application may occur before the braking system is fully re-charged.

Visualizing these conditions, it will be readily appreciated that the limited reduction in the equalizing reservoir pressure, when charged at this temporary excess pressure, may well fail to reduce the brake pipe pressure below that in the auxiliary reservoirs on the cars of the train and produce any application of the brakes at all. Even if there is some reduction in brake pipe pressure below that in the auxiliary reservoirs, and some application of the brakes occurs, nevertheless such brake application is less than that available, since the reduction in brake pipe pressure is cut off on account of the limited reduction feature with reference to the excess pressure in the equalizing reservoir, rather than with respect to the available braking pressure in the auxiliary reservoirs.

With this explanation, it can now be pointed out how the release valve DV cooperates with the other devices of the system of my invention to produce a brake application under these peculiar conditions, and making in fact the same limited reduction in the brake pipe pressure as if it were the same as the pressure in the auxiliary reservoirs. Under the special conditions in question, with the air brake system only partially re-charged, and with excess pressure in the brake pipe and equalizing reservoir, the pressure in the pressure chamber 75 of the distributing valve is lower than that in the brake pipe, and consequently the valve 82 is open. When the brake valve actuator is automatically operated, and the equalizing reservoir connected to the reduction reservoir, the pressure in the equalizing reservoir is vented into the reduction reservoir and thence to atmosphere through the open valve 82; and this venting continues until the excess pressure in the equalizing reservoir is relieved, and this pressure is equal to, or slightly less than, the pressure in the pressure chamber 75, whereupon the valve 82 closes. When the valve 82 closes, the reduction reservoir then becomes effective to determine the amount of reduction that will occur in the equalizing reservoir. In other words, the limited reduction feature does not start to take effect, so to speak, until the pressure in the equalizing reservoir and brake pipe has dropped to correspond with what is available for braking. Putting it another way, the pressure limiting device operates on the basis of pressure in the auxiliary reservoirs on the train, and actually available for braking, rather than upon the pressure in the equalizing reservoir existing at the instant the automatic brake application takes place.

It is preferred to connect the lower chamber 73 of the release valve DV to the brake pipe rather than to the equalizing reservoir, because leakage would then be less objectionable. In this preferred arrangement, the brake pipe pressure may drop slower than the pressure in the equalizing reservoir, due to the greater volume of the brake pipe, and the valve 82 may not close, with the chamber 73 connected to the brake pipe, until after the pressure in the equalizing reservoir has fallen lower than that in the pressure chamber 75 and in the auxiliary reservoirs on the car, thereby resulting in a heavier automatic reduction. This is on the side of safety, and with a long train in particular, is considered to be preferable. It should be understood, however, that the lower chamber 73 of the release valve DV may be connected to the equalizing reservoir, without materially changing the functions and operation characterizing the invention.

One desirable characteristic of my invention is that the release valve DV operates to open the valve 82 each time the brakes are applied and released, whether manually or automatically; and consequently the parts of this release valve are kept in good operating condition, and are not, due to sticking, corrosion or the like, likely to fail to operate properly when required, as sometimes happens with valves which remain stationary for long periods.

*Modification of Fig. 3.*—In Fig. 3, I have shown the release valve DV applied to a brake applying device separate from the engineer's brake valve. This brake applying device, which is shown in the simplified form, and is commonly termed an application valve, operates to make a limited reduction in brake pipe pressure at the service rate, and also to prevent charging of the brake pipe in some suitable way, as by cutting off main reservoir pressure from the engineer's brake valve, so that the automatic brake application occurs even if the engineer's brake valve is in the running condition, or the engineer tries to prevent such brake application by putting his brake valve in the release position.

In the application valve AV shown, which is a simplified form and is merely typical of devices of this character, a piston 105 with a relatively small vent hole 106 therein, fits in a cylinder portion, and is urged to the inactive position shown by a spring 107. This cylinder portion opens into a valve chamber supplied with main reservoir pressure; and this pressure acts on the left hand side of the piston 105. The space in the cylinder portion on the right hand side of the piston 105 is connected by a pipe 108 to an electro-pneumatic valve EV, which closes off this pipe when energized, and exhausts it to atmosphere when de-energized. This valve EV is preferably a modified form of the valve EPV shown in Fig. 1, embodying the same features of construction, but using only one valve. The piston 105 is connected by a stem 109 to a slide valve 110 in the usual way.

The parts are shown in their normal inactive position. With the valve EV energized, the pressure is equalized through the vent hole 106 on both sides of the piston 105, and the spring 107 moves the slide valve 110 to the position shown. In this position, main reservoir pressure is supplied through passage 111 to the brake pipe, so that the engineer may release and re-charge in the usual way. The brake pipe B. P. is connected by a passage 112 to the space underneath the equalizing discharge piston 113, of the same construction used in the bottom of the usual engineer's brake valve. The brake pipe is also connected through the passage 112, cavity 114 and passage 115 to the upper side of said discharge piston 113 and to an equalizing reservoir 116. A reduction reservoir 117 is connected by pipe 118, passage 119 and cavity 120 in the slide valve 110 to an exhaust port 121. This reduction reservoir is connected to the release valve DV by a pipe 122, in the same way as in Fig. 1.

When the valve EV is de-energized, the pressure on the right hand side of the piston 105 is exhausted at a greater rate than it can be supplied through the vent hole 106, and said piston is forced to the right against the opposition of the spring 107, the slide valve shifting to the brake applying position. In this brake applying position, the valve laps passage 111, cutting off main reservoir from the engineer's brake valve, so that the automatic brake application is not prevented. Also, the cavity 120 in the slide valve 110 connects the passages 115 and 119, putting the equalizing reservoir 116 and the reduction reservoir 117 into direct communication. The pressure in the equalizing reservoir 116, therefore, reduces, preferably gradually at the service rate, until the pressure in these two reservoirs equalizes. By proportioning the volumes of the reservoirs 116 and 117, this equalization pressure may be made anything desired, to give a brake application of the desired intensity. As the pressure in the equalizing reservoir 116 drops, the discharge piston 113 vents the brake pipe pressure at the same rate and to the same amount, the discharge of this valve being to atmosphere through passage 123, cavity 124 and exhaust port 121. When the valve EV is again energized, in the simplified construction of application valve shown, the piston 105 returns to the inactive position, exhausting the reduction reservoir 117 to atmosphere, and connecting the equalizing reservoir 116 to the brake pipe. It is desirable, however, that the engineer should perform some positive act to release the brakes after an automatic application; and it should be understood that the application valve AV is preferably constructed in a suitable manner, not shown in the simplified form, such that the valve will not return to the normal position, after an automatic operation, unless the engineer moves his brake valve to the lap position, for example, or otherwise does some positive act.

It will be observed that the automatic brake application, and the limited reduction feature, in this modified form of Fig. 3, is accomplished by devices performing the same or equivalent functions as those shown in Fig. 1 and hereinbefore explained. Consequently, it would seem to be unnecessary to explain the complete operation of this modified form, and point out how the release valve DV serves to assure a brake application of a definite intensity, even though the automatic operation occurs during the critical time that the braking system is being recharged after a previous manual application. It will be readily appreciated that, until the brake pipe pressure drops to the point where it is the same, or slightly higher than, the pressure in the pressure chamber of the distributing valve, the reduction reservoir 117 is connected to atmosphere, and the limited reduction does not begin, so to speak.

Where a separate equalizing reservoir and equalizing discharge piston and valve are used, as in Fig. 3, it is possible to use some expedient, such as a restricted port, by-passed by a check valve, in the connection between the equalizing reservoir and the brake pipe, such that the pressure in the equalizing reservoir will build up from the brake pipe at a relatively slow rate, compared with the rate at which the auxiliary reservoirs on the train re-charge, and yet exhaust into the reduction reservoir at a higher rate, corresponding to the service rate of venting the brake pipe. Such an arrangement would serve to assure an automatic brake application following a manual application and occurring during the re-charging period. For example, a restricted orifice and check valve, such as diagrammatically shown in Fig. 4 and hereinafter explained, may be placed in the passage 115 between the equalizing reservoir 116 and the passage leading to the upper side of the equalizing piston 113. In such a modified form, which is obvious, and has not been separately shown, the release valve DV may be omitted, and reliance placed upon the restricted orifice to prevent building up pressure in the equalizing reservoir at a rate faster than the pressure builds up in the auxiliary reservoirs on the train, so that any automatic application gives a limited reduction in brake pipe pressure based upon the pressure in the auxiliary reservoirs and available for braking, rather than the excess pressure that may exist in the brake pipe. It is important, it is believed, that there should be no restriction in the passages connecting the opposite sides of the discharge piston 113. Otherwise in the two-application stop, an improper brake application may occur upon the release of the first application, perhaps emergency in character, because the pressure in the equalizing reservoir 116 and in the chamber above the equalizing piston 113 would be lower than brake pipe pressure.

For the same reason, a restricted orifice in the pipe connecting the equalizing reservoir 20 to the engineer's brake valve of Fig. 1, while it would serve a similar function to the release valve DV, would be objectionable under ordinary conditions, because an improper brake application might occur when the engineer made a graduated release. To explain, when the engineer makes a graduated release, raising the brake pipe pressure slightly, and brings his brake valve to the lap position, a small volume in the chamber above the equalizing discharge piston 35 (Fig. 1) is quickly equalized with the lower pressure in the equalizing reservoir 20, causing the equalizing discharge piston valve to open.

While the release valve DV, or a device performing equivalent functions, is preferred, since it takes care of all common operating conditions, I desire to have it understood, however, that my invention embraces a restricted feed port in the pipe between the engineer's brake valve and the equalizing reservoir 20 in Fig. 1, and a restricted feed port, preferably by-passed by a check valve in the passage 115 connected to the equalizing reservoir in Fig. 3, although such specific adaptation or modification, as a substitute for the release valve DV, has not been specifically shown.

*Modification of Fig. 4.*—In Figs. 1 and 3, I have shown chamber 72 of the release valve DV, above the upper diaphragms 66, connected to the pressure chamber of the distributing valve of the well known E. T. equipment, it being contemplated that the pressure in said pressure chamber will correspond to that existing in the auxiliary reservoirs on the cars of the train. On account of the more frequent use of the triple valve in the distributing valve, and the resultant wear, it sometimes appears that the pressure in the pressure chamber builds up at a greater rate than in the ordinary auxiliary reservoir, due to leakage by the triple valve piston, as well as supply through the feed groove. On account of this, and also to avoid any objections of establishing a connection through the pressure chamber of the distributing valve, I contemplate that, if desired, a special reservoir may be provided, as shown in Fig. 4, to have therein a pressure comparing with that in the auxiliary reservoirs of the train. Referring to Fig. 4, the reservoir 130 is connected by a pipe 131 to the upper chamber 72 of the release valve DV. This reservoir is connected by an adjustable restricted orifice 132 to the brake pipe B. P., and this restricted orifice 132 is by-passed by a suitable check valve 133 shown as a simplified form of a ball check valve. The check valve 133 permits the pressure in the reservoir 130 to drop at the same rate as the brake pipe pressure, so that while the brakes are being applied, the pressure in this reservoir 130 corresponds closely to the pressure in the auxiliary reservoirs on the train. Upon a release of the brakes, and during the re-charging, the supply from the brake pipe to the reservoir 130 is through the restricted orifice 132, so that the pressure in said reservoir builds up slowly at a rate corresponding to the rate at which the auxiliary reservoir pressure builds up through the said groove in the triple valve. In this modified construction of Fig. 4, it should be understood that the diaphragms 66 and 67 of the release valve DV should be proportioned such that the valve 82 is seated, as soon as the pressure in the reservoir 130 is nearly as high as the brake pipe presure, otherwise due to leakage and other unavoidable causes occurring in practice, the valve 82 may fail to seat.

While I have shown and described various specific embodiments of the invention, it should be understood that various modifications and adaptations of the particular construction illustrated may be made without departing from the scope of the invention. Broadly considered, a characteristic feature of the invention resides in the provision of means which assures the limited reduction in brake pipe pressure, occurring upon an automatic brake application, being based upon the pressure existing in the auxiliary reservoirs of the train and available for braking, rather than upon the existing brake pipe pressure, which may be temporarily high. This principle may be carried out in various ways, as already indicated. It should be understood, therefore, that the invention embraces a variety of specific constructions and combinations, as set forth in the appended claims.

What I claim is:—

1. Automatic brake applying apparatus for braking systems of the type in which the brake pipe is normally charged and in which a predetermined reduction in brake pipe pressure effects a full service brake application, comprising, means automatically operated by suitable train control apparatus for venting the brake pipe, and means for discontinuing such venting when the brake pipe pressure has fallen to that point where a full service brake application results even though the automatic brake application is initiated immediately after the brakes have been manually released.

2. Automatic brake applying apparatus for braking systems of the type in which the brake pipe is normally charged and in which a predetermined reduction in brake pipe pressure effects a full service brake application comprising, means automatically operated by suitable train control apparatus for venting the brake pipe, and means for discontinuing such venting when the brake pipe pressure has fallen to a pressure value a predetermined degree below that existing in the pressure chamber of the distributing valve (forming part of the braking system) when the brake application is initiated.

3. Automatic brake applying apparatus for braking systems of the type in which the brake pipe is normally charged and in which a predetermined reduction in brake pipe pressure effects a full service brake application comprising, means automatically operated by suitable train control apparatus for venting the brake pipe, and means for discontinuing venting of the brake pipe when the brake pipe pressure has fallen to that value at which auxiliary reservoir pressure and brake cylinder pressure equalize in spite of the fact that the brake pipe pressure may have been higher than auxiliary reservoir pressure at the time the brake application was initiated.

4. Automatic brake applying apparatus for braking systems of the type in which the brake pipe, the equalizing reservoir and the auxiliary reservoirs are normally charged, and in which venting of the brake pipe causes fluid pressure to flow from the auxiliary reservoir into the brake cylinder until the auxiliary reservoir pressure has fallen to that existing in the brake pipe, unless the brake pipe pressure has fallen below equalization pressure of the auxiliary reservoir and the brake cylinder comprising, brake applying mechanism operated automatically by suitable train control apparatus and which if operated vents the brake pipe, and means for discontinuing such venting effective when the brake pipe pressure has fallen to the pressure of equalization between the auxiliary reservoir and the brake cylinder pressures, said last mentioned means functioning as stated even though the brake pipe application was initiated when the brake pipe pressure was higher than the auxiliary reservoir pressure.

5. Automatic brake applying apparatus for braking systems of the type in which the brake pipe, the equalizing reservoir and the auxiliary reservoirs are normally charged, and in which the venting of the brake pipe causes fluid pressure to flow from the auxiliary reservoir into the brake cylinder until the auxiliary reservoir pressure has fallen to that existing in the brake pipe unless brake pipe pressure has fallen below equalization pressure of the auxiliary reservoir and the brake cylinder pressures comprising, brake applying mechanism operated automatically by suitable train control apparatus which if operated vents the brake pipe, and means for discontinuing such venting when the pressure in the brake pipe has fallen a predetermined amount below that existing in the auxiliary reservoir at the time the automatic brake application was initiated even through the automatic brake application occurred at a time when brake pipe pressure was higher than auxiliary reservoir pressure.

6. Automatic brake applying apparatus for braking systems of the type in which the brake pipe, the equalizing reservoir and the auxiliary reservoirs are normally charged, and in which venting of the brake pipe causes fluid pressure to flow from the auxiliary reservoir into the brake cylinder until the auxiliary reservoir pressure has fallen to that existing in the brake pipe unless the brake pipe pressure has fallen below equalization pressure of the auxiliary reservoir and the brake cylinder pressures comprising, brake applying mechanism operated automatically by suitable train control apparatus and which if operated vents the brake pipe, means for discontinuing such venting, including a reduction reservoir into which such equalizing reservoir is vented when an automatic brake application is initiated, and means for venting said reduction reservoir to atmosphere so long as brake pipe pressure is higher than auxiliary reservoir pressure.

7. Automatic brake applying apparatus for braking systems of the type in which the brake pipe, the equalizing reservoir and the auxiliary reservoirs are normally charged, and in which venting of the brake pipe causes fluid pressure to flow from the auxiliary reservoir into the brake cylinder until the auxiliary reservoir pressure has fallen to that existing in the brake pipe unless the brake pipe pressure has fallen below equalization pressure of the auxiliary reservoir and the brake cylinder pressures comprising, brake applying mechanism separate from that used in effecting a manual application of the brakes including a separate equalizing mechanism if operated connects the separate equalizing reservoir to the reduction reservoir and vents the brake pipe to the equalized pressure in these reservoirs, said separate equalizing pressure being normally connected to the brake pipe through a restricted opening by-pass by a check valve, said check valve permitting the exhaust of pressure from the separate equalizing reservoir only.

8. Automatic brake applying apparatus for braking systems of the type in which the brake pipe, the equalizing reservoir and the auxiliary reservoirs are normally charged, and in which venting of the brake pipe causes fluid pressure to flow from the auxiliary reservoir into the brake cylinder until the auxiliary reservoir pressure has fallen to that existing in the brake pipe unless the brake pipe pressure has fallen below equalization pressure of the auxiliary reservoir and the brake cylinder pressures comprising, brake applying mechanism operated automatically by suitable train control apparatus and which if operated vents the brake pipe, means for discontinuing such venting including a reduction reservoir into which such equalizing reservoir is vented when an automatic brake application is initiated, a pressure reservoir connected to the brake pipe through a restricted opening by-passed by a check valve permitting said pressure reservoir to charge only at the rate the auxiliary reservoirs are charged but to discharge very quickly when pressure changes in the brake pressure reservoir is substantially the same as that in the auxiliary reservoirs, and means for connecting said reduction reservoir to atmosphere so long as brake pipe pressure is higher than the pressure in the pressure reservoir.

9. Automatic brake applying apparatus for braking systems of the type in which the brake pipe, the equalizing reservoir and the auxiliary reservoirs are normally charged, and in which venting of the brake pipe causes fluid pressure to flow from the auxiliary reservoir into the brake cylinder until the auxiliary reservoir pressure has fallen to that existing in the brake pipe unless the brake pipe pressure has fallen below equalization pressure of the auxiliary reservoir and the brake cylinder pressures comprising, brake applying mechanism including the usual engineer's brake valve and a reduction reservoir, which brake valve is automatically operated to the service brake applying position by suitable train control mechanism under predetermined traffic conditions in a manner so that the engineer cannot prevent its operation and which if operated connects said equalizing reservoir to said reduction reservoir, and means for connecting said reduction reservoir to atmosphere when brake pipe pressure is higher than auxiliary reservoir pressure.

10. Automatic brake applying mechanism for railway air brake systems of the type in which the brake pipe is normally charged and in which venting of the brake pipe effects a brake application comprising, automatic means for venting the brake pipe, reduction limiting means for discontinuing the venting of the brake pipe when the brake pipe has been vented to a predetermined extent below the pressure existing therein when the automatic brake application was initiated, and means for rendering said reduction limiting means ineffective if an automatic brake application is initiated while the braking system is being recharged.

11. Automatic brake applying mechanism for railway air brake systems of the type in which the brake pipe is normally charged and in which venting of the brake pipe effects a brake application comprising, automatic means for venting the brake pipe, reduction limiting means for discontinuing the venting of the brake pipe when the brake pipe has been vented to a predetermined extent below the pressure existing therein when the automatic brake application was initiated, and means for rendering said reduction limiting means ineffective if an automatic brake application is initiated while the pressure in the brake pipe is above the pressure in the auxiliary reservoirs of the train.

12. Automatic brake applying mechanism for railway air brake systems of the type in which the brake pipe is normally charged and in which venting of the brake pipe effects a brake application comprising, automatic means for venting the brake pipe, reduction limiting means for discontinuing the venting of the brake pipe when the brake pipe has been vented to a predetermined extent below the pressure existing therein when the automatic brake application was initiated, and means for rendering said reduction limiting means ineffective if an automatic brake application is initiated while the pressure in the pressure chamber of the distributing valve of said air brake system is below the pressure in the brake pipe.

13. An electro-magnetic valve comprising, an electro-magnet of the shell type consisting of a magnetic shell having a stationary perforated core projecting upwardly on the inside thereof, a movable core in alignment with but above said stationary core, valve means including a plunger fastened to the lower end of said shell, and a rod of non-magnetic material passing through the perforation of said stationary core and engaging said movable core and the plunger of said valve means.

14. An electro-magnetic valve comprising an electro-magnet of the shell type consisting of a magnetic shell having a stationary perforated core projecting upwardly on the inside thereof, a movable core in alignment with but above said stationary core, valve means including a plunger fastened to the lower end of said shell, a rod of non-magnetic material passing through the perforation of said stationary core connecting said movable core and the plunger of said valve means, and adjustable means for changing the spaced relation between the plunger of said valve and said movable core.

15. An electro-magnetic valve comprising, an electro-magnet of the shell type consisting of a magnetic shell having a stationary perforated core projecting upwardly on the inside thereof, a movable core in alignment with but above said stationary core, valve means including a plunger fastened to the lower end of said shell, means adjustably connected to said movable core for forming an abutment, and a rod of non-magnetic material extending through the perforation in said stationary core and having its upper end engaging said abutment and its lower end engaging said valve means, whereby said movable core is adjustably connected to said valve means.

16. An electro-magnetic valve comprising, an electro-magnet of the shell type consisting of a magnetic shell having a stationary perforated core projecting upwardly on the inside thereof, a movable core in alignment with and above said stationary core, valve means including a plunger fastened to the lower end of said shell, means adjustably connected to said movable core for forming an abutment, a rod of non-magnetic material extending through the perforation in said stationary core and having its upper end engaging said abutment and its lower end engaging said valve means, and spring means for lifting said valve against the downward pull of said movable core.

17. An electro-magnetic valve comprising, an electro-magnet of the shell type consisting of a magnetic shell having a stationary perforated core projecting upwardly on the inside thereof, a movable core in alignment with and above said stationary core, valve means including a plunger fastened to the lower end of said shell, means adjustably connected to said movable core for forming an abutment, a rod of non-magnetic material extending through the perforation in said stationary core and having its upper end engaging said abutment and its lower end engaging said valve means, a spring for yieldingly supporting said movable core and means for adjusting the tension of said spring.

18. An electro-pneumatic valve comprising, a cylindrical magnetic shell having a perforated stationary magnetic core extending part way therethrough, a valve chamber fastened to the bottom of said shell, a valve in said valve chamber a movable perforated core above but in alignment with said stationary core, means threaded into the perforation of said movable core for forming an adjustable abutment, and a rod of non-magnetic material passing through the perforation of said stationary core into the perforation of said movable core and engaging said abutment and the valve in said valve chamber.

19. An electro-pneumatic valve comprising a cylindrical magnetic shell having a perforated stationary magnetic core extending part way therethrough, a valve chamber fastened to the bottom of said shell, a valve in said valve chamber, a movable perforated core above but in alignment with said stationary core, means threaded into the perforation of said movable core for forming an adjustable abutment, a rod of non-magnetic material passing through the perforation of said stationary core into the perforation of said movable core against the adjustable abutment in said movable core and having its lower end engaging the valve in said valve chamber, and spring means for yieldingly supporting said movable core.

20. In a railway braking system of the type in which the brake pipe is normally charged and wherein venting of the brake pipe effects a brake application, automatic means for venting the brake pipe and effecting a brake application, reduction limiting means for stopping venting of the brake pipe due to operation of said automatic means effective when a predetermined reduction has been made after said reduction limiting means started functioning, and means for determining starting of functioning of said reduction limiting means.

21. In a railway braking system of the type in which the brake pipe is normally charged and wherein venting of the brake pipe effects a brake application, automatic means for venting the brake pipe and effecting a brake application, reduction limiting means for stopping venting of the brake pipe due to operation of said automatic means effective when a predetermined reduction has been made after said reduction limiting means started functioning, and means for starting the functioning of said reduction limiting means when the brake pipe pressure has fallen to a value corresponding to the pressure in auxiliary reservoirs of the train.

22. In a railway braking system of the type in which the brake pipe is normally charged and wherein venting of the brake pipe effects a brake application, automatic means for venting the brake pipe and effecting a brake application, and reduction limiting means including a chamber the pressure in which corresponds to that existing in the auxiliary reservoir of the train when a brake application is initiated by said automatic means.

23. In a railway braking system of the type in which the brake pipe is normally charged and wherein venting of the brake pipe effects a brake application, automatic means for venting the brake pipe and effecting a brake application, and reduction limiting means including a chamber which may be charged through a restricted opening but may be discharged through a larger opening including a check valve for determining the standard pressure by which the ultimate brake pipe pressure reduction is determined.

In testimony whereof I affix my signature.

CHARLES S. BUSHNELL.